United States Patent [19]

Saam

[11] Patent Number: 4,941,199
[45] Date of Patent: Jul. 10, 1990

[54] UPLINK POWER CONTROL MECHANISM FOR MAINTAINING CONSTANT OUTPUT POWER FROM SATELLITE TRANSPONDER

[75] Inventor: Thomas J. Saam, Melbourne, Fla.

[73] Assignee: Scientific Atlanta, Atlanta, Ga.

[21] Appl. No.: 334,146

[22] Filed: Apr. 6, 1989

[51] Int. Cl.$^5$ .............................................. H04B 1/60
[52] U.S. Cl. ......................................... 455/10; 455/52
[58] Field of Search .................. 455/69, 9, 10, 12, 52, 455/70, 63; 370/104, 69.1, 75

[56] References Cited

U.S. PATENT DOCUMENTS

| | | | |
|---|---|---|---|
| 4,301,533 | 11/1981 | Acampora et al. | 455/10 |
| 4,731,866 | 3/1988 | Muratani et al. | 455/10 |
| 4,752,967 | 6/1988 | Bustamante et al. | 455/52 |
| 4,776,035 | 10/1988 | Duggan | 455/10 |

OTHER PUBLICATIONS

"Closed-Loop Transmitting Power Control System for K-Band Satellite Communications," EGAMI, 1983, IEEE, vol. AES-19, No. 4.
"Prediction of Attenuation by Rain," Crane, 1980 IEEE, vol. COM-28, No. 9.
"Communications Satellite Systems," Martin, 1978.

*Primary Examiner*—Robert L. Griffin
*Assistant Examiner*—Curtis Kuntz
*Attorney, Agent, or Firm*—Antonelli, Terry & Wands

[57] ABSTRACT

Compensation for rain fades in a VSAT communications network is obtained by a uplink power control mechanism incorporated in a master station, which maintains the power output level of the satellite transponder constant without incorporating excessive static margins into the link power budget. A variable attenuator, which controls the output power of the master station's high power amplifier is initially set at a prescribed level which will produce the intended satellite amplifier EIRP for a 'clear sky' condition. The master station monitors the output of the satellite amplifier and derives a measure of the signal-to-noise ratio of downlinked signals. Knowing the variable attenuator setting and the signal-to-noise ratio of the downlinked signals, the magnitude of attenuation of outlink carrier frequency signals transmitted from the master station to the satellite is determined. In the event of a rain fade, the setting of the variable attenuator is adjusted by an amount that compensates for the fade and thereby causes outlink carrier frequency signals conveyed by the satellite amplifier device to remain effectively constant. An estimate of the error in the attenuator setting is preferably derived in accordance with the ratio of the difference between the squared (I) and (Q) channel values $((S+N)^2 - N^2)$ to the square of the quadrature channel-derived noise value $N^2$ of a Costas loop in the master station's receiver.

20 Claims, 2 Drawing Sheets

UPLINK POWER CONTROL MECHANISM FOR MAINTAINING CONSTANT OUTPUT POWER FROM SATELLITE TRANSPONDER

FIELD OF THE INVENTION

The present invention relates in general to satellite communication systems and is particularly directed to a scheme for maintaining the output power of a satellite transponder constant irrespective of variations in atmospheric conditions (rain fades) between the transmitting terminal and the satellite, through precise control of the uplink power transmitted from a transmitting station

BACKGROUND OF THE INVENTION

Very small aperture Ku-band (e.g. 12/14 GHz) satellite terminal (VSAT) networks are currently gaining wide acceptance as an economic alternative to terrestrial communication systems. Advantageously. Ku-band systems enjoy a lower susceptibility to terrestrial radio interference; also the higher carrier frequencies allow Ku-band systems to provide equivalent gain using smaller-diameter dishes. Taken as a group, these factors provide important economic advantageous for large Ku-band VSAT networks. Unfortunately, the higher carrier frequencies also mean increased susceptibility to rain fade.

More particularly, rain fade attenuation is caused principally by scattering and absorption by water droplets. Studies, such as that described in an article by R. K. Crane, entitled "Prediction of Attenuation by Rain", IEEE Transactions on Communications, Volume COM-28, pgs. 1717-1733, Sept. 1980, indicate that the liquid state of the water dominates the attenuation, whereas vapor (fog) and solid state water (frozen ice crystals) associated with clouds do not substantially contribute to attenuation. According to a rain fade model proposed in the above-identified Crane article, attenuation increases principally as a function of frequency and rain rate in accordance with the expression:

$$A = a \times R^b (dB/km) \quad (1)$$

where R is the point rain rate, a is a multiplier which is dependent upon frequency, and b is an exponent which is also dependent upon frequency.

A 40 mm/hr rain storm in the path of a transmission between a VSAT earth station and a Ku-band satellite will produce a 10 dB signal fade. Because of climate differences, point rain rates vary greatly with geography. A 40 mm/hr rain rate, for example, occurs, on average, 10 hours per year in Florida. In Maine, on the other hand, such a storm occurs on the average only 10 minutes per year. From a statistical analysis of climate/rain fall conditions, a geographical model of rain rate probability distribution, which provides a basis for anticipating the occurrence of a rain fade, can be derived. The above reference to Crane, for example, describes a global model of a rain fade probability distribution.

Because a rain fade causes a reduction in signal-to-noise ratio (C/N), which must meet a minimum standard for a maximum permissible bit error rate in a VSAT digital communication network, some mechanism is usually provided to adjust one of several variables in the satellite link power budget in order to compensate for the decrease in signal to noise ratio. Among these variables are antenna gain, receiver noise temperature, coding rate and transmit power (EIRP). T. T. Ha, in an article entitled "Digital Satellite Communications", Indianapolis, Ind., Howard Sams and Co., 1987, discusses some of these variables as trade offs for systems with static margin. From a practical standpoint, however, transmit power and coding gain are the only choices for a dynamic or an adaptive fade compensation system. Adaptive coding for rain fade compensation has been proposed for a Ka-band (20/30 GHz) NASA ACTS system, as described in an article by T. Inukai et al entitled "ACTS TDMA Network Control Architecture", Proc. AIAA, 12th International Communications Satellite Systems Conference, pp. 225-239, March 1988. In this compensation system, an earth station using the ACTS satellite would switch to a more robust forward error correction coding scheme during a rain fade. However the complexities of changing coding schemes on-the-fly preclude adaptive coding in less expensive commercial VSAT systems which use linear satellite transponders. For the time being, simple transmit power control is the only economic alternative for commercial VSAT systems.

Static margin is the simplest and most common technique for transmit power control. The static transmit power level includes a margin which provides excess signal-to-noise ratio during clear sky conditions. This additional power protects the link until the rain fade exceeds the margin. As a consequence, unless it is raining, the system user must pay the cost for the extra power margin, so that satellite capacity will be available during rain fades.

To overcome this unused power penalty in a static system, dynamic power control mechanisms, such as those described in articles by M. Seta et al entitled "A Study on the Transmitting Power Control for Earth Stations", Proc. A1AA 12th International Communications Satellite Systems Conference, pp 174-184, March 1988 and S. Egami entitled "Closed-Loop Transmitting Power Control System for K-band Satellite Communications", IEEE Trans. on Aerospace and Electronic Systems, vol. AES-19 pp. 577-583, July 1983, has been proposed. Dynamic power control techniques include independent control, centralized control, pilot reference control and pair control. In an independent control scheme, each station takes care of its own fade without assistance from another station. In the past this has been done by observing the occurrence of a fade and then manually increasing transmit output power in the hope that the impact of the fade will be overcome. Centralized control involves a cooperative central station which measures and broadcasts uplink fade estimates to the remote stations. Pilot control requires each station to estimate downlink fading using a dedicated receiver monitoring a satellite-originate pilot or beacon signal. Pair control involves the use of multiple stations to cooperatively exchange uplink fade observations. Pilot control and pair control rain fade compensation systems are deployed in some satellite systems today. However, since the main reason for employing a VSAT network is its low cost, centralized, pair and pilot control mechanisms are not practical solutions to the rain fade problem. Instead, VSAT systems need an automatic method of independent control for rain fade compensation.

More specifically, a typical VSAT network, a portion of which is shown in FIG. 1, employs a star topology. At the center, or hub, of the star is a master station 10 which sources an outlink satellite channel 12 to the remote stations 20, located at the points of the star.

Master station 10 employs a large antenna 14, while each remote station employs a very small aperture dish 24. The communication mechanism between master and remote stations is such that the master 10 transmits on a continuous, powerful outlink frequency (e.g. 14 GHz) on which are modulated individual messages addressed to specific remote stations. The remote stations 20 transmit in burst format over a return link frequency (e.g. 14 GHz) 22. Within the satellite 30 is a shared Ku-band linear satellite transponder with a 12 GHz downlink frequency, which typically has a saturated EIRP of 46 dBW. A minimum 4 dB back-off (namely reduction for peak power) helps prevent intermodulation noise. The outlink modulation scheme uses a fraction of the total available power. Also frequency division access allows the VSAT network to share transponder usage with other systems, including single channel per carrier (SCPC) networks. Because of the cost effective nature of a VSAT network, it can be appreciated that multi or interstation dynamic control mechanisms, such as centralized control, pair control, or the use of an additional pilot/beacon reference, are not practical solutions to the rain fade problem in such a network. As noted above, however, to date independent power control has involved only trial and error adjustment of the transmitted power, an approach which is tenuous at best. These "trial and error" or open loop independent control systems lack sufficient accuracy (greater than ten percent peak error) to permit the master outlink to also act as a pilot beacon, an important operational requirement of VSAT networks.

SUMMARY OF THE INVENTION

In accordance with the present invention compensation for rain fades in a VSAT communications network is obtained by a new and improved independent (uplink) power control mechanism incorporated in the master station, which maintains the power output level of the satellite transponder constant without incorporating excessive static margins into the link power budget. For this purpose, the variable attenuator, which controls the output power of the master station's high power amplifier and thereby the signal strength of outlink carrier frequency signals transmitted to the satellite, is initially set at a prescribed level which will produce the intended satellite amplifier EIRP for a 'clear sky' condition. Via a downlink receiver, the transmitting station monitors the output of the satellite amplifier and derives a measure of the signal-to-noise ratio of the downlinked signals. Knowing the variable attenuator setting and measure of the signal-to-noise ratio of the downlinked signals, the magnitude of attenuation of outlink carrier frequency signals transmitted from the master station to the satellite is determined. In the event of a variation in the condition of the signal transmission path between the master station and the satellite (a rain fade), which causes a reduction in the output of the satellite to an EIRP less than its initially calibrated clear sky level, the current setting of the variable attenuator (which is now in error due to the rain fade) is adjusted (increased) by an amount that compensates for the error and thereby causes outlink carrier frequency signals conveyed by the satellite amplifier device to remain effectively constant. An estimate of the received signal power (to noise ratio) is preferably derived by squaring each of the in-phase (I) and quadrature (Q) channels of a Costas loop in the master station receiver. The ratio of the difference between the squared channel values $((S+N)^2 - N^2)$ to the square of the quadrature channel-derived noise value $N^2$ yields a power measure (in dB) that remains effectively 90% linear over the operational range of the master station. Because the rain fade modifies the effective sky temperature and thereby the figure of merit G/T of the master station's antenna the setting of the variable attenuator is further 'corrected' in accordance with the change in sky temperature.

DETAILED DESCRIPTION

Figure 1:
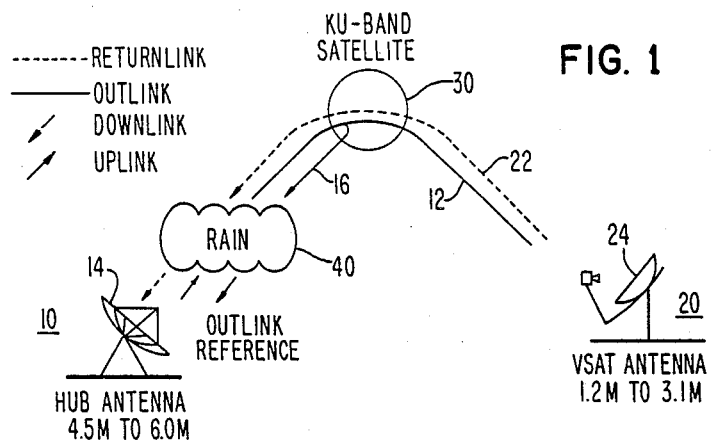
FIG. 1 diagrammatically depicts a portion of a VSAT network.

Before describing in detail the particular improved uplink power control mechanism in accordance with the present invention, it should be observed that the present invention resides primarily in a novel structural combination of conventional communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily inpended to illustrate the major structural components of the system in a convenient functional grouping, whereby the present invention may be more readily understood.

As described above, the uplink power control mechanism of the present invention adjusts the outlink power transmitted from the master station as a function of local observation of the master station's own signal over a downlink from the satellite. In other words, uplink power control is to be carried out without assistance from any other station in the network. In effect, the present invention employs a servo loop (coupled from the master station through the satellite and back to the master station over the downlink) to hold the satellite amplifier output power (EIRP), previously established at a prescribed level during clear sky conditions, constant in the presence of a rain fade. Advantageously, since the outlink satellite EIRP is maintained constant, the remote stations are able to employ the satellite output as a pilot reference. This constant EIRP outlink signal can be used by the remote stations to compensate for a rain fade in the satellite-to-remote transmission signal path.

With reference again to FIG. 1 of the drawings, a rain fade (storm) 40 is shown in the signal transmission path between master station 10 and the satellite 30 (14 GHz uplink). Because the master station monitors its own transmission, downlinked from the satellite (at 12 GHz), the outlink signal, which is returned over downlink 16 traverses the storm 40 twice. This is known as a "double-hop" fade. It should be noted that the outlink signal is not adjusted to compensate for the double-hop fade but only for the fade encountered by the outlink signal in the path from the hub station to the satellite. Namely, the objective of the invention is to maintain the EIRP of the satellite 30 constant.

In order to facilitate an understanding of the rain fade compensation mechanism of the present invention, it is initially useful to define, in simplified terms, the relationships that characterize the attenuation of a transmission through a rain storm. A more detailed explanation of the components that are included within these simplified terms and their involvement in the rain fade compensation mechanism of the present invention will be set forth below.

Letting C represent the transmitted EIRP from the satellite 30 (which is to be maintained constant), T a lumped sum value which represents the transmitted power (and includes free space loss, satellite again, master station EIRP, etc.) from master station 10 over the outlink channel 12, and U the uplink fade attenuation imparted by the rain fade 40 (absent free space loss), the following simplified expression (in dBs) may be derived:

$$C = T - U \quad (2)$$

Similarly, the downlink power (to noise ratio) R received at master station 10 may be expressed in terms of a lumped sum output (C) of the satellite and the downlink attenuation (D) imparted by the fade 40 as $$R = C - D \quad (3)$$

The relationship between the uplink attenuation U and downlink attenuation D may be approximated by a proportionality constant K (using the above-referenced Crane model), namely $$D = K \times U \quad (4)$$

As a consequence, the following expression for uplink attenuation U can be derived:

$$(T - R')/(K + 1) = U \quad (5)$$

where R' is the received power adjusted for a corrected figure of merit G/T of the master station's antenna (due to change in sky temperature). The initial values of T and R are calibrated in clear sky conditions.

Figure 2:
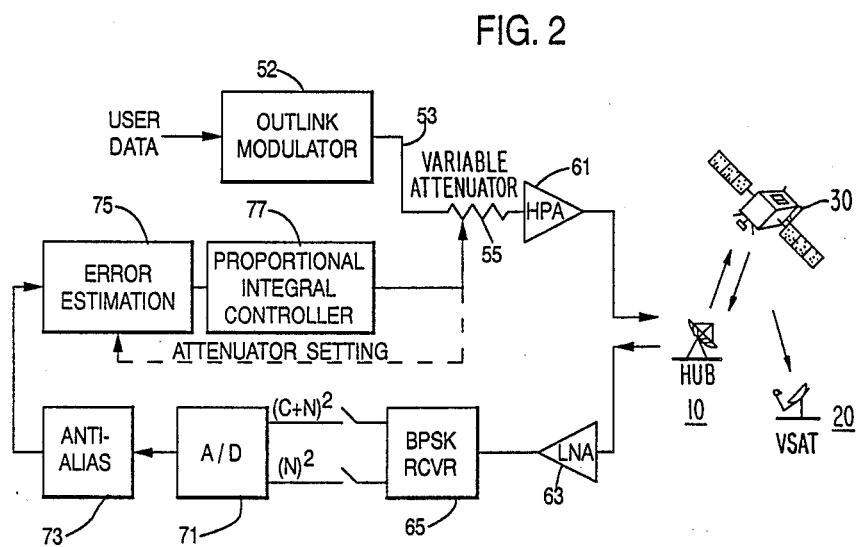
FIG. 2 is a diagrammatic illustration of a closed servo loop uplink power control mechanism which provides independent correction to the output power from a master station transmitter in a star-configured VAST network.

Knowing the magnitude of the uplink fade U, the transmitted power T can be adjusted to maintain the output C of the satellite constant. In accordance with the present invention, a signal processing mechanism which effectively executes the above simplified relationships and provides the necessary correction to the output power from the master station's transmitter is effected by way of a closed-loop servo system diagrammatically illustrated in FIG. 2. As shown therein, user data, coupled over link 51, is encoded by an outlink modulator (e.g. BPSK modulator) 52 and output therefrom over line 53 to a variable attenuator 55, the setting of which is adjusted in accordance with the servo loop mechanism of the invention. The output of variable attenuator 55 is amplified by a high powered amplifier 61 for application to the master station's transmitter and transmitted over outlink 12 to the satellite 30. The receiver in master station 10 monitors the output EIRP from satellite 30 (via downlink 16) and coupled the received signal through a low noise amplifier 63 to a BPSK receiver 65. BPSK receiver 65 preferably contains a Costas loop from which signal and noise estimates can be derived, as will be described in detail below in connection with the description of FIG. 3. Suffice it to say that BPSK receiver 65 supplies, via its in-phase (I) channel, a signal $(C+N)^2$ representative of the square of the data and the noise and, via its quadrature-phase channel (Q), an estimate $N^2$ of the square of the received noise. These values $(C+N)^2$ and $N^2$ are then filtered by an anti-aliasing filter 73 and coupled to an error estimation processor 75. Using the relationships set forth in equations (2), (3), (4) and (5), processor 75 estimates the error e between the current setting of variable attenuator 55 and a new corrected setting that will maintain the EIRP of the satellite constant. The output of processor 75 is applied through a proportional integral controller 77 to variable attenuator 55 to adjust its setting, as necessary, to maintain the output power of the satellite constant. In the course of estimating the error in the setting of transmit attenuator 55, processor 75 implements the above-described simplified expressions (2)–(5) using a more detailed set of relationships (6)–(12) as follows.

More particularly, an expression for the output power EIRP (C) of the satellite may be given by:

$$EIRP = EIRP_{master} - L_{fs,up} - F_{up} + G_{sat} - L_{upc} \text{ (dB)} \quad (6)$$

where $EIRP_{master}$ is the power transmitted from master station 10, $L_{fs,up}$ is uplink free space loss, $F_{up}$ is uplink rain fade attenuation, $G_{sat}$ is the satellite gain and $L_{upc}$ is the attenuation to be imparted by the uplink power correction mechanism using attenuator 55.

On the downlink side, the received signal-to-noise ratio C/N may be expressed by:

$$C/N = EIRP_{des} - L_{fs,dwn} - F_{dwn} + G/T_{master} - B_k \text{(dB)} \quad (7)$$

In expression 7, $EIRP_{des}$ corresponds to the desired satellite output power, $L_{fs,dwn}$ corresponds to the downlink free space loss, $F_{dwn}$ is the downlink rain fade, $G/T_{master}$ is the gain/temperature figure of merit of the master station's antenna and $B_k$ is Boltzman's constant.

The error e in the setting of variable attenuator 55 can be defined as $$e = -F_{up} - L_{upc} \quad (8)$$

Ideally, this value is to be driven to zero, thereby maintaining the output power (EIRP) of the satellite constant. In addition, as noted previously, the relationship between the uplink fade $F_{up}$ and the downlink fade $F_{dwn}$ can be approximated by proportionality constant K due to the difference in uplink and downlink frequencies.

Namely $F_{dwn}/F_{up} = K \quad (9)$

Because the Figure of merit (G/T) of the master station will be different during a storm than for clear sky conditions, a correction in G/T during rain, versus a G/T calibration standard for clear sky conditions, is necessary in the execution of equation (7).

More particularly, G/T correction may be defined in accordance with the expressions:

$$\delta N = 10 \text{ Log } ((\delta T + T_{master})/T_{master}) \quad (10)$$

$$\delta T = T_{rain}(1 - L_{rain}), \text{ and} \quad (11)$$

$$L_{rain} = 10^{-F/10} \quad (12)$$

where N=noise power and T=noise temperature, in degrees K.

The system is normally calibrated during a clear sky condition to establish a 'clear sky' figure of merit $G/T_{CLRSKY}$ and to set the output of the satellite at a desired power level $EIRP_{des}$ (db). Thereafter, adjustments in the setting of variable attenuator 55 are made dynamically using the servo control loop shown in FIG. 2, with error estimate derived in accordance with the expressions (6)–(12) by way of processor 75 which monitors the current setting of the attenuator and the signal/noise $((C+N)^2/N^2)$ outputs from BPSK receiver 65.

As pointed out previously, BPSK receiver 65 preferably employs a Costas loop from which squared values of data plus noise $(C+N)^2$ and noise $N^2$ estimates are derivable. These values are derivable from a Costas loop, such as that diagrammatically illustrated in FIG. 3, the I and Q channel signals 78 and 79, respectively, of which are coupled to power law detectors 82 and 83. In accordance with the operation of the Costas loop, in-phase (I) channel 78 is representative of the sum of the information signal and noise (C+N), while the quadrature-phase (Q) channel 79 is representative of noise N, per se. Power law detectors 82 and 83 effectively square the signal plus noise and the noise components of the I and Q channels, respectively, to provide estimates of $(C+N)^2$ and $(N)^2$ over output links 84 and 85. These outputs are shown diagrammatically in FIG. 2, referenced above, as the inputs to the analog-to-digital converter 71. The error estimation mechanism carried out by processor 75 determines the ratio of the difference between the I and Q channels outputs to the Q channel outputs. Namely, the downlink power measure (C/N) is estimated by the ratio $((S+N)^2-(N)^2)/(N)^2$.

Figure 3:
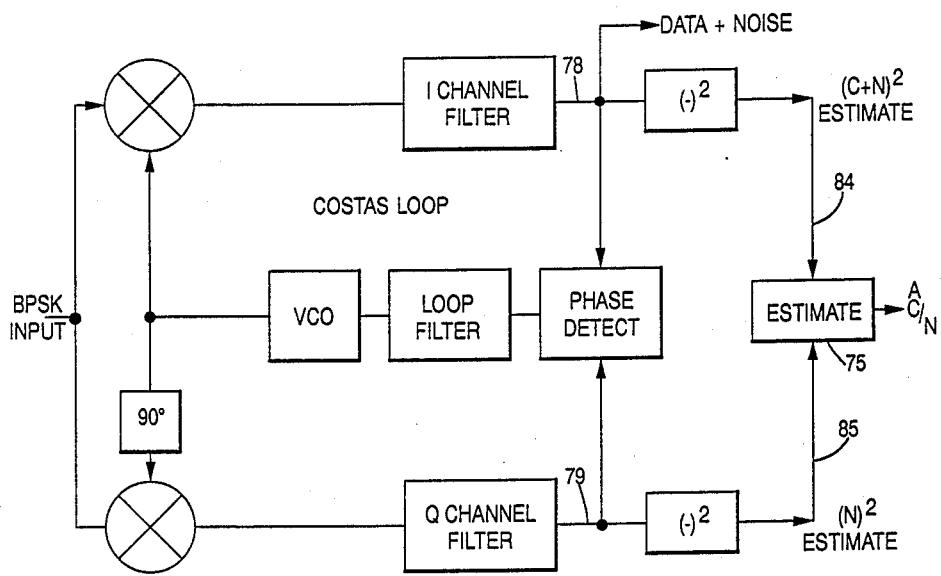
FIG. 3 shows a Costas loop used for deriving an estimate of the signal-to-noise ratio in the monitored outlink signal as part of the uplink power control mechanism of FIG. 2.
Figure 4:
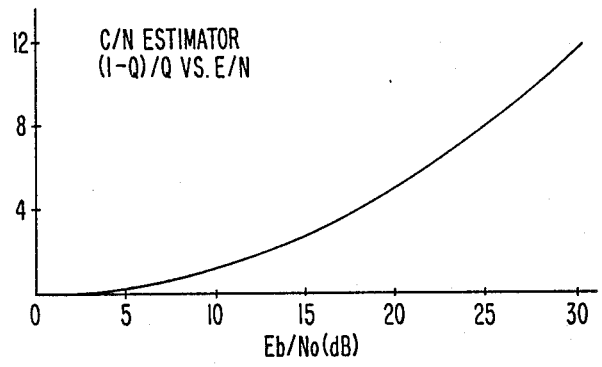
FIG. 4 shows measured data from a Costas loop receiver/estimator depicted in FIG. 3.

FIG. 4 shows measured data from a Costas loop receiver/estimator depicted in FIG. 3, above. The estimator C/N response generally follows a square law characteristic (in dB) and remains effectively 90% linear over the operational range of the master station's transmitter. In the servo loop of FIG. 2, because proportional integral controller 77 dominates the closed loop response, the cut-off frequency of anti-aliasing filter 73 is set higher than the proportional integral controller open loop response, in order to avoid interaction and resonance. Rain fade measurements indicate that a maximum slew rate of 15 dB per minute and a frequency response on the order of 0.05 Hz are practical for proportional integral controller 77. Consequently, a two second sampling interval will satisfy lower and upper bound requirements. The integral feedback control supplied at the output of the proportional integral controller 77 adjusts the setting of the attenuator 55 in accordance with the expression:

$$L_{upc} = -K_p \times e - K_i \times \int e \, dt + L_o \quad (13)$$

where $L_o$ is the nominal (clear sky) setting of the upc attenuator 55, $K_p$ is the proportionality constant and $K_i$ is the integral constant. To prevent ringing, $K_p >> K_i$.

Because the uplink power control mechanism of the present invention maintains the output of the satellite 30 constant, the outlink channel 12 from the satellite may be used by any of the remote stations 20 as a reference beacon for compensating for rain fades in the transmission path between the remote terminal and the satellite proper.

More particularly, during clear sky conditions, remote station 20 monitors the incoming outlink channel 12 and stores information representative of the received C/N. Should a rain fade occur in the transmission path between the satellite and the remote station (resulting in a degradation in remote statio-monitored C/N), compensation of a return link burst transmitted by the remote station can be effected based upon the difference between the stored reference, previously established during clear sky conditions, and the magnitude of the fade. In other words, in addition to the basic mechanism of providing self-contained uplink power control, an added advantage of the present invention is the fact that, with the EIRP of the satellite 30 on the outlink channel 12 to all remote stations 20 being maintained constant, each remote station is effectively provided with a pilot reference which can be used to adjust return link bursts to compensate for fades in the transmission path between the remote station and the satellite. It should also be noted that since the remote station may also use the Costas loop estimator (FIG. 3) to demodulate the outlink signal, a costly beacon receiver is not required.

As will be appreciated from the foregoing description, the present invention offers a low cost, independent uplink power control mechanism for compensating for rain fades in a VSAT communications network that effectively maintains the power output level of the satellite transponder constant without incorporating excessive static margins into the link power budget. Since the system monitors only the master station's own continuously transmitted outlink carrier, no additional pilot tone is required. Moreover, by maintaining the EIRP of the satellite constant, the outlink carrier may be used by the remote stations as a reference beacon for compensating for fades in the transmission path between a remote station and the satellite.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use in a satellite communications network wherein signals transmitted over an uplink communications channel from a transmitting terminal to a satellite amplifier device are amplified by said satellite amplifier device and conveyed therefrom over an outlink channel to a receiver terminal, a method of controlling the output of said transmitting terminal so as to maintain the strength of signals output by said satellite amplifier device effectively constant irrespective of variations in atmospheric conditions in the uplink signal transmission path between the transmitting terminal and the satellite comprising the steps of:

(a) transmitting first signals over said uplink communications channel to said satellite to be amplified by said satellite amplifier device and conveyed therefrom over said outlink channel to said receiver terminal and over a downlink channel to a receiver device located at said transmitter terminal, and generating second signals representative of the strength of the transmitted first signals;

(b) monitoring, at said transmitter terminal, first signals that have been amplified by said satellite amplifier device and conveyed therefrom over said downlink channel, and producing therefrom third signals representative of the signal-to-noise ratio in the monitored signals;

(c) in response to said second and third signals, generating fourth signals representative of the attenuation of said first signals resulting from variations in conditions in the uplink signal transmission path to said satellite; and (d) adjusting the strength of said first signals as transmitted by said transmitter terminal in accordance with said fourth signals, so as to compensate for the attenuation thereof resulting from conditions in said uplink signal transmission path and thereby maintain the strength of signals output by said satellite amplifier device effectively constant.

2. For use in a satellite communications network wherein data to be transmitted from a first station to a second station is transmitted via an outlink carrier frequency from said first station to a satellite amplifier device, amplified and conveyed therefrom to a second station, a method of controlling the operation of a transmitter at said first station so as to maintain the strength of data-modulated outlink carrier frequency signals conveyed from the output of said satellite amplifier device effectively constant irrespective of a variation in atmospheric conditions between said first station and the satellite comprising the steps of:

(a) setting the operation of said transmitter such that the strength of outlink carrier frequency signals conveyed from said satellite amplifier device is at a prescribed signal strength;

(b) monitoring, at a receiver provided at said first station, outlink carrier frequency signals downlinked from said satellite amplifier device to said first station and deriving therefrom a measure of the signal-to-noise ratio of said downlinked signals;

(c) determining a measure of attenuation of outlink carrier frequency signals transmitted from said first station to said satellite in accordance with the measure of the signal-to-noise ratio measure derived on step (b) and the transmitter operation setting of step (a); and (d) adjusting the strength of outlink carrier frequency signals transmitted by said transmitter by an amount that compensates for the measure of attenuation determined in step (c) and thereby causes outlink carrier frequency signals conveyed by said satellite amplifier device to remain effectively constant.

3. A method according to claim 2, wherein said transmitter includes an adjustable attenuator through which the output signal strength of signals transmitted from said first station over said outlink carrier frequency to said satellite is controlled, and step (a) comprises, for a clear-sky condition, adjusting said attenuator to a first setting which causes outlink carrier frequency signals that are transmitted from said first station to said satellite to be conveyed from the output of said satellite amplifier device at a prescribed clear-sky signal strength.

4. A method according to claim 2, wherein said variation in atmospheric conditions between said first station and said satellite corresponds to the presence of a rain fade, and wherein step (b) includes the step of deriving said measure of the signal-to-noise ratio of signals downlinked to the receiver at said first station and corrected in accordance with the influence upon the figure of merit of said receiver of a change in sky temperature, resulting from said rain fade.

5. A method according to claim 4, wherein said transmitter includes an adjustable attenuator through which the output signal strength of signals transmitted from said first station over said outlink carrier frequency to said satellite is controlled, and step (a) comprises, for a clear-sky condition, adjusting said attenuator to a first setting which causes outlink carrier frequency signals that are transmitted from said first station to said satellite to be conveyed from the output of said satellite amplifier device at a prescribed clear-sky signal strength.

6. A method according to claim 5, wherein step (c) comprises determining a measure of attenuation of outlink carrier frequency signals transmitted from said first station to said satellite in accordance with the current setting of said attenuator and said first setting of said attenuator.

7. A method according to claim 4, wherein step (d) comprises adjusting said attenuator in accordance with the corrected measure of signal-to-noise ratio and said first setting of said attenuator.

8. A method according to claim 4, wherein step (b) comprises deriving a measure of the signal.to.noise ratio of said downlinked signals in accordance with the ratio of the square of the sum of signal plus noise to the square of the noise in down linked signals.

9. A method of operating a satellite communications network having a first station from which outlink signals destined for a second station are transmitted over an uplink communications channel to a satellite amplifier device, amplified thereby and conveyed over a downlink channel to said second station, comprising the step of:

(a) controlling the operation of the outlink carrier frequency signal transmitter at said first station so as to cause the strength of outlink carrier frequency signals conveyed from the output of said satellite amplifier device to be effectively constant irrespective of the presence of a rain fade between said first station and the satellite by:

(a1) setting the operation of said transmitter such that the strength of outlink carrier frequency signals conveyed from said satellite amplifier device is at a prescribed signal strength;

(a2) monitoring, at a receiver provided at said first station, outlink carrier frequency signals downlinked from said satellite amplifier device to said first station and deriving therefrom a measure of the signal-to-noise ratio of said downlinked signals;

(a3) determining a measure of attenuation of outlink carrier frequency signals transmitted from said first station to said satellite in accordance with the measure of the signal-to-noise ratio derived in step (a2) and the transmitter operation setting of step (a1); and (a4) adjusting the strength of outlink carrier frequency signals transmitted by said transmitter by an amount that compensates for the measure of attenuation determined in step (a3) and thereby causes outlink carrier frequency signals conveyed by said satellite amplifier device to remain effectively constant.

10. A method according to claim 9, further including the step of (b) compensating for the presence of a rain fade on the return link channel between said satellite and said second station by:

(b1) measuring, at said second station, the strength of outlink signals conveyed from said satellite amplifier device to a receiver at said second station during a clear sky condition between said satellite and said second station; and (b2) monitoring the strength of outlink signals received at said second station and, in response to the strength of monitored signals undergoing a reduction from the clear sky condition measured in step (b1), increasing the strength of return link signals transmitted from said second station.

11. For use in a satellite communications network wherein signals transmitted over an uplink communications channel from a transmitting terminal to a satellite amplifier device are amplified by said satellite amplifier device and conveyed therefrom over an outlink channel to a receiver terminal, an uplink power control mechanism for controlling the output of said transmitting terminal so as to maintain the strength of signals output by said satellite amplifier device effectively constant irrespective of variations in atmospheric conditions between the transmitting terminal and the satellite comprising:

first means, coupled to a transmitter through which first signals are transmitted over said uplink communications channel to said satellite to be amplified by said satellite amplifier device and conveyed therefrom over said outlink channel to said receiver terminal and over a downlink channel to a receiver device located at said transmitter terminal, for generating second signals representative of the strength of the transmitted first signals;

second means, coupled to said receiver device, for monitoring first signals amplified by said satellite amplifier device and conveyed therefrom over said downlink channel and producing therefrom third signals, representative of the signal-to-noise ratio of the monitored signals;

third means, coupled to said first and second means, and responsive to said second and third signals, for generating fourth signals representative of the attenuation of transmitted first signals resulting from atmospheric conditions in said uplink channel from said transmitter terminal to said satellite; and fourth means, coupled to said third means, for adjusting the strength of said first signals as transmitted by said transmitter terminal in accordance with said fourth signals, so as to compensate for the attenuation thereof resulting from atmospheric conditions in said uplink channel and thereby maintain the strength of signals output by said satellite amplifier device effectively constant.

12. For use in a satellite communications network wherein user data to be transmitted from a first station to a second station is transmitted via an outlink carrier frequency from said first station to a satellite amplifier device, amplified and conveyed therefrom to a second station, an arrangement for controlling the operation of a transmitter at said first station so as to maintain the strength of the user data-modulated outlink carrier frequency conveyed from the output of said satellite amplifier device effectively constant irrespective of a variation in atmospheric conditions between said first station and the satellite comprising:

first means for setting the operation of said transmitter such that the strength of outlink carrier frequency signals conveyed from said satellite amplifier device is at a prescribed signal strength;

second means, coupled to a receiver at said first station, for monitoring outlink carrier frequency signals downlinked from said satellite amplifier device to said first station and deriving therefrom a measure of the signal-to-noise ratio of said downlinked signals;

third means, coupled to said first and second means, for deriving a measure of the attenuation of outlink carrier frequency signals transmitted from said first station to said satellite in accordance with the signal.to.noise ratio measure derived by said second means and the transmitter operation setting of said first means; and fourth means, coupled to said third means, for adjusting the strength of outlink carrier frequency signals transmitted by said transmitter by an amount that compensates for the measure of attenuation derived by said third means and thereby causes outlink carrier frequency signals conveyed by said satellite amplifier device to remain effectively constant.

13. An arrangement according to claim 12, wherein said transmitter includes an adjustable attenuator through which the output signal strength of signals transmitted from said first station over said outlink carrier frequency to said satellite is controlled, and said first means includes means, for a clear-sky condition, for adjusting said attenuator to a first setting which causes outlink carrier frequency signals that are transmitted from said first station to said satellite to be conveyed from the output of said satellite amplifier device at a prescribed clear-sky signal strength.

14. An arrangement according to claim 12, wherein said variation in atmospheric conditions between said first station and said satellite corresponds to the presence of a rain fade, and wherein said second means includes means for deriving said measure of the signal-to-noise ratio of signals downlinked to the receiver at said first station and corrected in accordance with the influence upon the figure of merit of said receiver of a change in sky temperature, resulting from said rain fade.

15. An arrangement according to claim 14, wherein said transmitter includes an adjustable attenuator through which the output signal strength of signals transmitted from said first station over said outlink carrier frequency to said satellite is controlled, and said first means includes means, for a clear-sky condition, for adjusting said attenuator to a first setting which causes outlink carrier frequency signals that are transmitted from said first station to said satellite to be conveyed from the output of said satellite amplifier device at a prescribed clear-sky signal strength.

16. An arrangement according to claim 15, wherein said third means includes means for deriving a measure of attenuation of outlink carrier frequency signals transmitted from said first station to said satellite in accordance with the current setting of said attenuator and said first setting of said attenuator.

17. An arrangement according to claim 14, wherein said fourth means includes means for adjusting said attenuator in accordance with the corrected measure of signal-to-noise ratio and said first setting of said attenuator.

18. An arrangement to claim 14, wherein said second means includes means for deriving a measure of the signal-to-noise ratio of said downlinked signals in accordance with the ratio of the square of the sum of signal plus noise to the square of the noise in down linked signals.

19. For use with a satellite communications network having a first station from which outlink signals destined for a second station are transmitted over an uplink communications channel to a satellite amplifier device, amplified thereby and conveyed over a downlink channel to said second station, a control system apparatus for controlling the operation said system to compensate for the presence of a rain fade comprising:

first means, coupled with a transmitter by way of which said outlink signals are transmitted, for setting the operation of said transmitter such that the strength of outlink carrier frequency signals conveyed from said satellite amplifier device is at a prescribed signal strength;

second means for monitoring, at a receiver provided at said first station, outlink carrier frequency signals downlinked from said satellite amplifier device to said first station and deriving therefrom a measure of the signal-to-noise ratio of said downlinked signals;

third means, coupled to said first and second means, for deriving a measure of attenuation of outlink carrier frequency signals transmitted from said first station to said satellite in accordance with the measure of the signal-to-noise ratio derived by said second means and the transmitter operation setting of said first means; and fourth means, coupled to said third means, for adjusting the strength of outlink carrier frequency signals transmitted by said transmitter by an amount that compensates for the measure of attenuation derived by said third means and thereby causes outlink carrier frequency signals conveyed by said satellite amplifier device to remain effectively constant.

20. A control system according to claim 19, further including fifth means, at said second station, for compensating for the presence of a rain fade in the return link channel between said second station and said satellite, said fifth means including means for measuring the strength of outlink signals conveyed from said satellite amplifier device to a receiver at said second station during a clear sky condition between said satellite and said second station and means for monitoring the strength of outlink signals received at said second station and, in response to the strength of monitored signals undergoing a reduction from the clear sky condition measured by said measuring means, for increasing the strength of return link signals transmitted from said second station.

* * * * *